United States Patent [19]

Bunting et al.

[11] 4,143,880
[45] Mar. 13, 1979

[54] REVERSE PRESSURE ACTIVATED ROTARY DRILL HEAD SEAL

[75] Inventors: Alison R. Bunting; Martin J. Sharki, both of Houston, Tex.

[73] Assignee: Dresser Industries, Inc., Dallas, Tex.

[21] Appl. No.: 889,323

[22] Filed: Mar. 23, 1978

[51] Int. Cl.² .................... F16J 15/56; F16J 15/32
[52] U.S. Cl. .................................. 277/31; 277/28; 277/59; 277/3; 166/82
[58] Field of Search .................... 166/82–84, 166/86–88; 277/3, 4, 15, 27, 28, 31, 59, 72 R, 72 FM, 74

[56] References Cited

U.S. PATENT DOCUMENTS

| 2,649,318 | 8/1953 | Skillman | 277/3 |
| 2,808,229 | 10/1957 | Bauer et al. | 166/82 X |
| 3,176,996 | 4/1965 | Barnett | 277/3 X |
| 3,295,389 | 1/1967 | Walischmiller | 277/59 X |
| 3,529,835 | 9/1970 | Lewis | 277/27 X |
| 3,631,834 | 1/1972 | Gardner et al. | 277/3 X |
| 3,653,350 | 4/1972 | Koons et al. | 277/3 X |
| 3,827,700 | 8/1974 | Kaller | 277/59 |
| 3,834,715 | 9/1974 | Butler | 277/59 X |
| 3,868,832 | 3/1975 | Biffle | 277/31 X |
| 3,999,766 | 12/1976 | Barton | 277/28 |

FOREIGN PATENT DOCUMENTS

| 2248156 | 4/1973 | Fed. Rep. of Germany | 277/59 |
| 333339 | 8/1930 | United Kingdom | 277/59 |

Primary Examiner—Robert S. Ward, Jr.
Attorney, Agent, or Firm—Eddie E. Scott

[57] ABSTRACT

An improved rotary drill head is provided having two lip seals installed in a seal cavity to provide a long lasting dynamic seal. The first lip seal is installed with the heel first and the second lip seal is installed with the lip first. Lubricant is maintained between the two seals at a pressure greater than the operating pressure of the rotary drill head. The lubricant pressure energizes the two lip seals. The abrasive fluid from the borehole is prevented from leaking past the seals because of the pressure differential. An infinitesimal amount of lubricant will leak past the lips of the seals thereby lubricating the seal.

6 Claims, 3 Drawing Figures

REVERSE PRESSURE ACTIVATED ROTARY DRILL HEAD SEAL

BACKGROUND OF THE INVENTION

The present invention relates to the art of earth boring and more particularly to rotary drill heads used in drilling oil and gas wells and the like.

The rotary drill head art is well developed. A rotary drill head is generally located below the rotary table of an oil well drilling rig. The drive kelly extends from the rotary table downward through the rotary drill head. A rotary swivel above the kelly allows drilling fluid to be pumped downward through the center of the kelly into the drill pipe and to the bottom of the borehole wherein it exits through nozzles in the drill bit and returns to the earth's surface in the annulus between the drill pipe and the wall of the borehole. Once the drilling mud is returned to the surface, it is processed to remove drill cuttings, debris and other materials such as gases entrained with the drilling mud. After processing, the mud is returned to the borehole through the drill string as previously described. It will be appreciated that a rotary seal must be provided to seal the annulus between the wall of the borehole and the rotating drill string. Rotary drill heads fulfill this function.

The rotary drill head must be rugged enough to withstand the high fluid pressures encountered during the drilling operation. A dynamic rotary seal must be provided and all of the foregoing must be accomplished while handling the highly abrasive and corrosive materials encountered during the drilling of the well. A further important requirement is that the entire system must be simple and easily repaired and/or replaced.

Rotary drill heads have traditionally used conventional packings and utilized the abrasive drilling fluid to energize the seal. Certain problems are encountered with such seals. When a pressure energized lip seal is used, the fluid being sealed normally leaks past the lip in infinitesimal amounts. In the case of a rotary drill head, when the abrasive drilling fluid leaks past the lip, both the seal and wear surface tend to be damaged. The present invention seeks to lengthen the life of the seals and wear surfaces of a rotary drill head. In the present invention the lubricant pressure energizes the lip seals rather than the drill fluid thereby excluding the abrasive drilling fluid from the seal area. Since the lubricant leaks past the lip seals no damage results to either the seal elements or the associated wear surfaces.

DESCRIPTION OF PRIOR ART

There are numerous patents showing rotary drill heads. The patents identified and described below are representative of the numerous prior art rotary drill head patents.

In U.S. Pat. No. 3,724,862 to M. S. Biffle, patented Apr. 3, 1973, a drill head and sealing apparatus therefor is shown. A drill head assembly for use in oil drilling operations in which there is provided a rotatable packing means for preventing abrasive well fluids or vapors from contacting the bearing surfaces of the rotatable portion of the drilling head and for preventing the escape of well fluids or vapors into the atmosphere is shown. The packing means is constructed such that the packing becomes tighter as the well pressure increases, thereby performing the function of a final control in the event of a blowout and is also constructed such that repacking may be performed externally to the drilling head without disassembly of the drill head or any of the rotatable parts therein.

In U.S. Pat. No. 3,868,832 to M. S. Biffle, patented Mar. 4, 1975, a rotary drilling head assembly is shown. The rotary drilling head assembly is for well bore forming operations and comprises a stationary housing which supports a rotatable sleeve. A stripper rubber located within the rotatable sleeve slidably receives a tubing string in sealed relationship therethrough. A second stripper rubber is removably mounted and spaced in superimposed relationship above the first rubber, with the first rubber being larger than the second so as to enable different size tubular goods to be withdrawn from the borehole with one of the strippers always sealingly engaging a marginal length of the tubular goods. Accordingly, the apparatus provides a method of controlling the well pressure during borehole forming operations. Each of the strippers are removably affixed to the rotating sleeve by quick disconnect means in the form of a circumferentially extending hinged clamped means.

In U.S. Pat. No. 3,934,887 to M. S. Biffle, patented Jan. 27, 1976, a rotary drilling head assembly is shown. A rotary drilling head assembly having a main body through which an axial bore is formed for sealingly receiving in an axially rotatable and longitudinally sealable manner, a driving member therethrough, thereby enabling the driver member to be moved longitudinally respective to the head while it is being axially rotated by the turntable is shown. An outflow passageway conducts fluid flow away from the head, while a second seal means controls fluid flow between the relative rotating parts of the assembly.

DESCRIPTION OF SEALING ART

The sealing art is a very highly developed art with a tremendous volume of publications reflecting the state of the art. The publications identified and described below are representative of the sealing art. These publications are not prior art to the present invention since the present invention is in the rotary drill head art; however, a review of the following publications is worthwhile for a better understanding of the present invention.

The article, "How to Seal Rotating Shafts Against High Pressures" by Walter Coopey in *Chemical Engineering*, July 1951, pages 116 and 117 describes some of the problems associated with sealing rotating shafts. A shaft seal is described that depends upon the introduction of lubricant at process pressures between two packing rings.

In U.S. Pat. No. 2,394,364 to Neils A. Christensen, patented Feb. 5, 1946, a pressure seal is shown. A packing device is shown in connection with a rotary shaft. The shaft is provided with a pair of annular recesses to receive packing rings. The boss is provided with an annular recess intermediate the region of the two bearing rings. This recess is provided with a threaded opening for the reception of a pressure lubricant fitting.

SUMMARY OF THE INVENTION

The present invention provides an improved rotary drill head having a reverse pressure activated dynamic seal. The rotary drill head includes a wash pipe and a rotating drill head assembly positioned to rotate about the wash pipe. The rotating drill head assembly is sealingly engaged to the drill string and rotates with the drill string. An upper seal unit is positioned between the wash pipe and the rotating drill head assembly. A lower seal unit is positioned between the wash pipe and the rotating drill head assembly. The upper and lower seal units are separated by an annular space. Means are provided for maintaining lubricant in said annular space at a pressure greater than the pressure of the fluid in the well bore. The above and other features and advantages of the present invention will become apparent from a consideration of the following detailed description of the invention when taken in conjunction with the accompanying drawings.

DETAILED DESCRIPTION OF THE INVENTION

Figure 1:
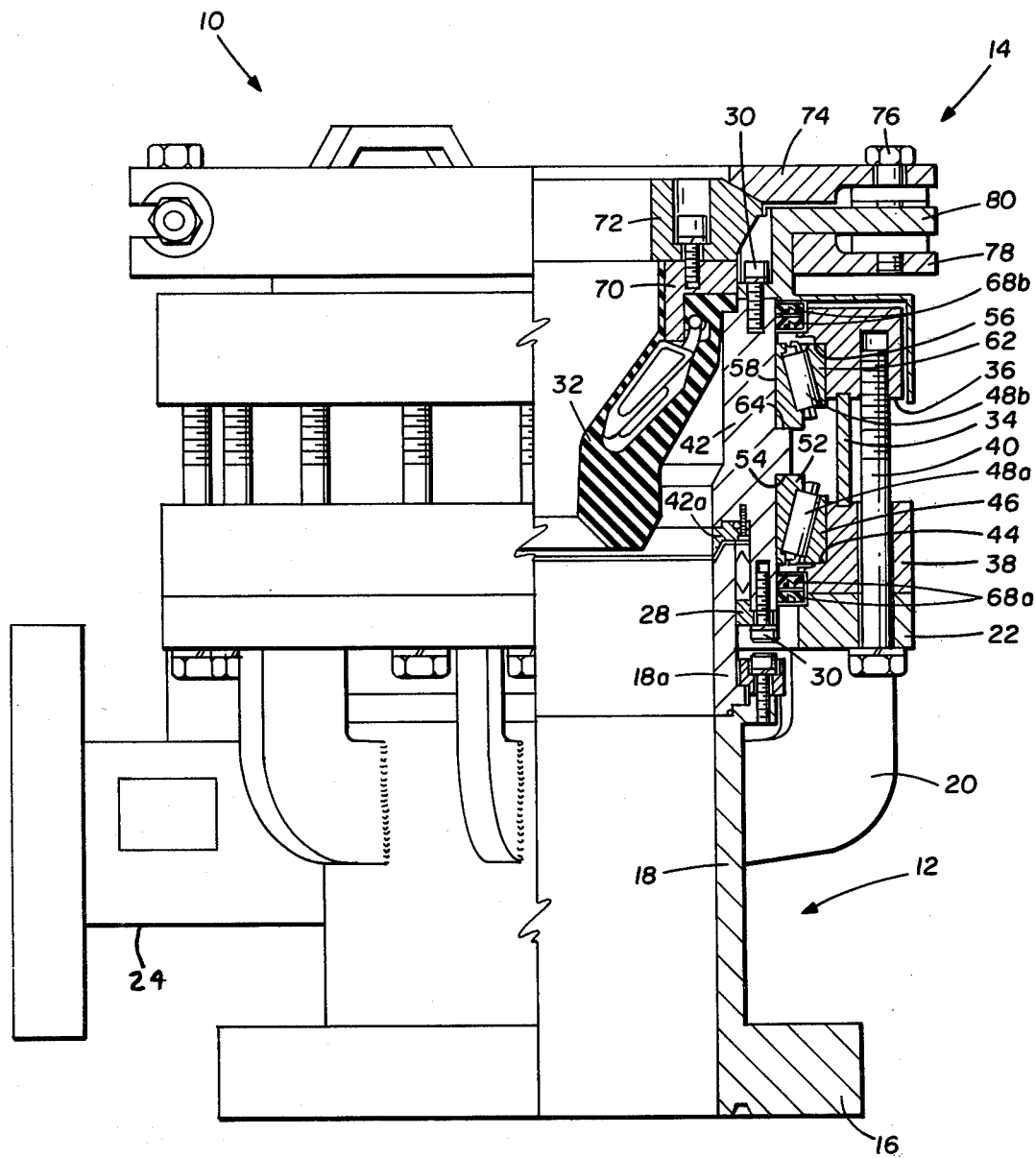
FIG. 1 is a view, partially in section, of a rotary drill head constructed according to the present invention.

Referring now to the drawings and in particular to FIG. 1, a rotary drill head 10 constructed in accordance with the present invention is illustrated. The rotary drill head 10 comprises a lower wash pipe assembly 12 and an upper rotating head assembly 14. The drill head 10 is mounted on the upper end of a well casing (not shown) or mechanical blowout preventer by a mounting flange 16. In the drilling operation a kelly (not shown) is positioned downwardly through the drill head 10. The drill pipe is attached to the kelly.

A lower wash pipe housing 18 (including 18a) extends upward from the mounting flange 16. The lower housing 18 is provided with a plurality of mounting struts 20 on its exterior walls for reinforcement. The mounting struts 20 are attached to a flange 22. The flange 22 contains a plurality of holes extending therethrough. The inside diameter of the mounting flange 22 is greater than the outside diameter of the lower housing 18. An annular space is therefore formed between the outside wall surface of the lower housing 18 and the inside wall surface of the mounting flange 22. A packing gland follower ring 28 is adapted to fit in the annular space formed by the housing 18 and the mounting flange 22.

The housing 18 is provided with a side outlet tube 24 mounted thereon by conventional means such as welding. On the extreme end of the side outlet tube 24 is a side outlet flange. In the operation of the drill head 10, the cuttings, debris and fluids are carried from the well by the side outlet tube 24.

A bearing housing spacer tube 34 is located above flange 22. Attached to the upper and lower ends of the bearing housing tube 34 are flanges 36 and 38 respectively which are held in place by a plurality of retaining bolts 40. The retaining bolts 40 are normally placed in position to complete assembly.

The lower flange 38 is provided with a shoulder 44 on its interior surface. An outer race member 46 which acts as a track for bearings 48a rests on shoulder 44. The bearings 48a are received within a seat of an inner race member 52 which engages a shoulder 54 formed on the surface of the sleeve 42. The bearings are preferably of the roller type having both thrust and radial capabilities. A similar configuration also occurs at the upper end of the bearing housing spacer 34. The upper flange 36 is provided with a shoulder 56 on its interior surface in which rests an outer race member 62 which acts as a track for bearings 48b which are received by an inner race member 58 which engages a shoulder 64 formed on the exterior surface of the rotating sleeve 42. Interposed between the lower flange 38 and the lower end of the sleeve 42 are conventional grease seals and dust keepers 68a which are held in position by conventional means. Interposed between the upper flange 36 and the upper end of the sleeve 42 are conventional grease seals and dust keepers 68b, said grease seals 68b being conventionally held in place.

Mounted over the lower wash pipe assembly 12 is the upper rotating head assembly 14 of the drill head 10. The upper assembly 14 includes the rotating parts of the drill head 10 and may be assembled separately prior to being mounted over the lower wash pipe assembly 12. A rotating sleeve 42, sometimes referred to as a rotating bowl, is mounted within the annulus formed by the interior of the bearing housing spacer 34 and associated parts. Means for receiving threaded bolts 30 are provided on both the upper and lower ends of the sleeve 42.

A resilient mass 32 having a cap 70 at one end and an elongated taper at the other end and an opening formed through the longitudinal axis of the mass forms what is commonly referred to as drilling rubber. This usually is a steel reinforced rubber. The cap 70 is mounted over a shoulder within the interior wall of the rotating sleeve 42. A metallic collar 72 having an annular opening is placed over the drilling rubber 32. The collar 72 is fixed to the rotating sleeve 42 by an upper cap 74, annular collar 80, retaining collar 78 and bolts 76. These elements compressively hold the drilling rubber 32 to the rotating sleeve 42. In operation, a kelly is passed downwardly through the drilling rubber 32 and connected to the other parts of the rotary drill string. The drilling rubber 32 provides a tight fit for the kelly thereby sealing the well pressure from the atmosphere. Because of the inherent design of the drilling rubber 32, the greater the interior well pressure, the tighter the seal becomes between the drilling rubber 32 and the kelly.

Figure 2:
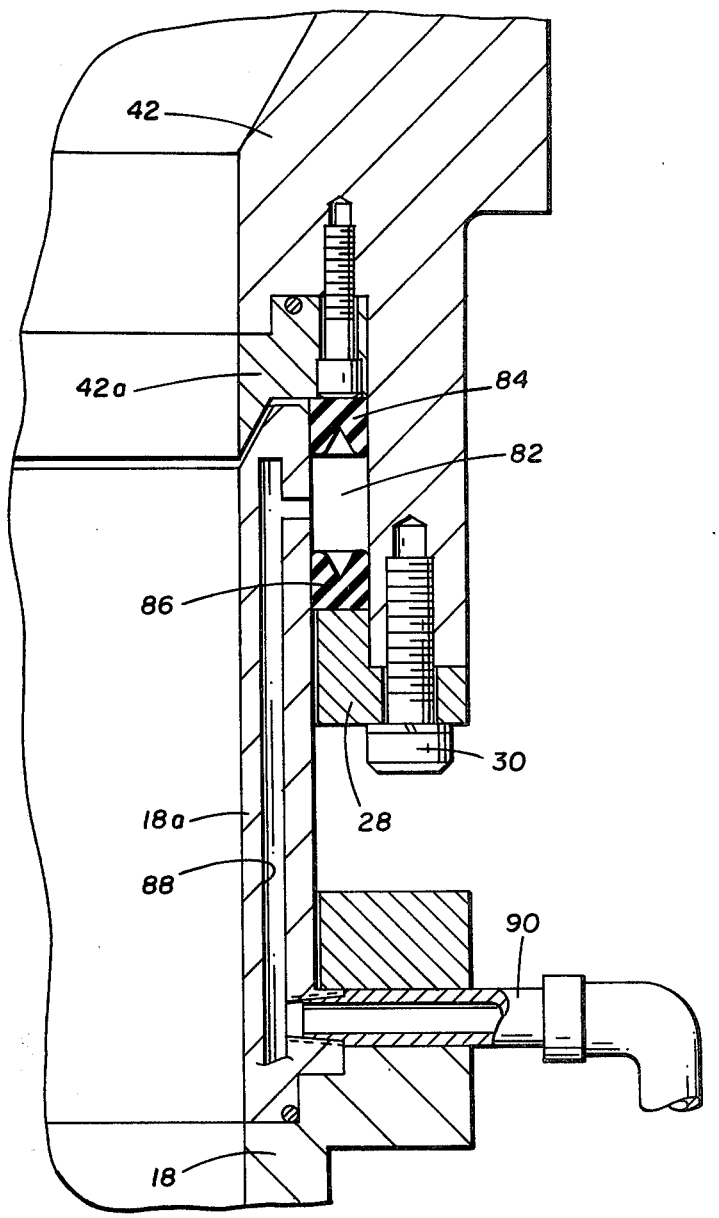
FIG. 2 is an enlarged cross sectional view of the wash pipe, rotating head assembly and seal of the present invention.

The dynamic rotating seal between the lower wash pipe assembly 12 and upper rotating head assembly 14 is provided between the upper section 18a of wash pipe 18 and an annular extension 42a of rotating sleeve 42. This seal will be described in detail with reference to FIG. 2. FIG. 2 shows an enlarged cross-sectional view of the drill head 10 taken at a different radial angle through drill head 10.

Referring now to FIG. 2, the upper assembly 14 is mounted on the lower assembly 12. There is thus formed an annular space 82 between the annular extension 42a on the bottom of the rotating sleeve 42 and the outside surface at the upper extremity 18a of the wash pipe 18. Into this void is positioned the seal assembly of the present invention. Two seals 84 and 86 are installed in the seal cavity formed by the void. The first seal 84 is installed heel first and the second seal 86 is installed lips first. Lubricant is pumped between the two seals 84 and 86 at a pressure greater than the operating pressure of the rotary drill head 10. This pressure is maintained and energizes the two lip seals 84 and 86. The abrasive fluid from the borehole cannot leak past the seals because of the pressure differential. As an infinitesimal amount of lubricant leaks past the lips of the seals 84 and 86 it lubricates the seal. The lubricant is introduced into the annular space 82 through passage 88 that extends through wash pipe section 18a and a pipe section 90 connected to passage 88. It will be appreciated that it is not a major task to replace the seals 84 and 86. This may be accomplished simply by dropping the packing gland follower ring 28 and inserting new seals into place.

Figure 3:
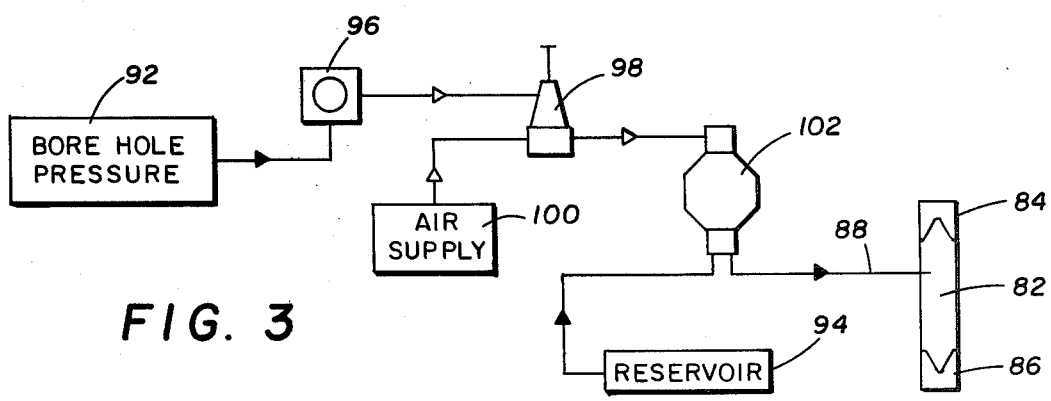
FIG. 3 is a flow diagram of the lubricator system of the rotary drill head shown in FIG. 1.

Referring now to FIG. 3, the fluidic circuit for maintaining the pressure of lubricant within the annular space 82 at a pressure greater than the pressure 92 of fluid in the borehole is illustrated. The borehole pressure provides a hydraulic signal through a diaphragm to a pressure transmitter and the pressure transmitter converts the hydraulic signal to an air signal. The air signal is sent to an amplifying relay and the amplifying relay multiplies the incoming signal from the transmitter by six. The multiplied air signal from the air supply goes to a hydraulic pump and the hydraulic pump sends lubricating oil from a reservoir to the seal annulus 82 at a pressure approximately 100 psi to 200 psi above borehole pressure. A diaphragm, such as a rubber diaphragm, allows the pressure of fluid within the borehole to be transmitted to a pressure transmitter 96. The pressure transmitter 96 is well known in the art, for example, it can be an Ashcroft pressure transmitter P/P, 0-1000 psi with 1-13 psi output. The air signal from pressure transmitter 96 is sent to amplifying relay 98. The amplifying relay 98 is well known in the art, for example, it can be a Moore 661A6 amplifying relay. The amplifying relay 98 multiplies the signal by six. The multiplied air signal from air supply 100 goes to the hydraulic pump 102. The hydraulic pump 102 is also well known in the art and, for example, may be an SC 10-500-1. The pump 102 sends lubricating oil from reservoir 94 to the seal annulus 82 at a pressure approximately 100 psi to 200 psi above borehole pressure.

The structural details of a reverse pressure activated rotary drill head seal system having been described the operation of the system will now be considered. The present invention lengthens the life of the seals and wear surfaces of the rotary drill head 10. In the present invention the lubricant pressure energizes the lip seals 84 and 86 thereby excluding the abrasive borehole fluid from the seal area. Since lubricant leaks past the lip seals no damage results to either the seal elements or the associated wear surfaces.

The rotating head assembly 14 is sealingly engaged to the drill string and rotates with the drill string. The kelly is passed downwardly through the drilling rubber 32. The drilling rubber 32 provides a tight fit with the kelly thereby sealing the well pressure from the atmosphere and engaging the rotary head assembly 14 to the drill string to rotate therewith.

The upper head assembly 14 is mounted on the lower wash pipe assembly 12. An annular void 82 is formed between the bottom of the rotating sleeve 42a and the outside surface of the upper extremity 18a of the wash pipe 18. Into this void is positioned the seals 84 and 86. The packing gland follower ring 28 is adapted to fit into the bottom of the void 82 for the retention of the seals 84 and 86 and is held in place by bolts 30 which are threadedly fixed into the bottom of the rotating sleeve 42.

The lubricant is maintained in said annular space at a pressure greater than the pressure of the fluid in the well bore. The borehole pressure 92 is used to send a hydraulic signal through the pressure transmitter 96 to the amplifying relay 98. The amplifying relay 98 multiplies the incoming signal by six. The multiplied signal goes to the hydraulic pump 102. The pump 102 sends lubricating oil from the reservoir 94 to the seal cavity 82 at a pressure approximately 100 psi to 200 psi above borehole pressure.

The embodiments of the invention in which an exclusive property or privilege is claimed are defined as follows:

1. A rotary drill head apparatus that provides a seal between a rotary drill string and the well bore to contain the pressure of fluid within the well bore, comprising:
   a wash pipe extending from the well bore;
   a rotating head assembly positioned to rotate about said wash pipe, said rotating head assembly being sealingly engaged to rotate with said rotary drill string;
   first lip seal means for providing a dynamic seal between the rotary drill string and the well bore, said first lip seal means having a pair of lip elements;
   second lip seal means for providing a dynamic seal between the rotary drill string and the well bore, said second lip seal means having a pair of lip elements;
   a space between said first lip seal means and said second lip seal means with said space being between said pair of lip elements of said first lip seal means and said pair of lip elements of said second lip seal means; and
   means for maintaining lubricant in said space at a greater pressure than the pressure of fluid within the well bore.

2. In a rotary drill head that provides a seal between a rotary drill string and the well bore to contain the pressure of fluid within the well bore, the improvement comprising:
   a wash pipe extending from the well bore;
   a rotating head assembly;
   first lip seal means for providing a dynamic seal between the wash pipe and the rotating head assembly;
   a first pair of lip elements on one end of said first lip seal means;
   second lip means for providing a dynamic seal between the wash pipe and the rotating head assembly;
   a second pair of lip elements on one end of said second lip seal means;
   a space between said first seal means and said second seal means, said first pair of lip elements and said second pair of lip elements being directly exposed to said space; and
   means for maintaining lubricant in said space at a greater pressure than the pressure of fluid within the well bore.

3. In a rotary drill head that provides a dynamic seal between a rotary drill string and the well bore thereby containing the pressure of fluid within the well bore, said rotary drill head including a wash pipe, a rotating head assembly positioned to rotate about said wash pipe and means for sealingly engaging said rotating head assembly to said rotary drill string, the improvement comprising:
   an upper lip seal means positioned between said wash pipe and said rotating head assembly, said upper lip seal means including an upper pair of lip elements;
   a lower lip seal means positioned between said wash pipe and said rotating head assembly, said lower seal means including a lower pair of lip elements;
   an annular space separating said upper seal means and said lower seal means, said upper pair of lip elements and said lower pair of lip seal elements being directly exposed to said annular space; and means for maintaining lubricant in said annular space at a pressure substantially 100 psi to 200 psi greater than the pressure of fluid within the well bore.

4. In a rotary drill head that provides a dynamic seal between a rotary drill string and the well bore thereby containing the pressure of fluid within the well bore, said rotary drill head including a wash pipe, a rotating head assembly positioned to rotate about said wash pipe and means for sealingly engaging said rotating head assembly to said rotary drill string, the improvement comprising:

an upper lip seal unit positioned between said wash pipe and said rotating head assembly;

a pair of upper lip seal elements projecting from said upper lip seal unit;

a lower seal unit positioned between said wash pipe and said rotating head assembly;

a pair of lower lip seal elements projecting from said lower lip seal unit;

an annular space separating said upper seal unit and said lower seal unit with said pair of upper lip seal elements and said pair of lower lip seal elements being directly exposed to said annular space; and means for maintaining lubricant in said annular space at a pressure substantially 100 psi to 200 psi greater than the pressure of fluid within the well bore.

5. In a rotary drill head that provides a dynamic seal between a rotary drill string and the well bore thereby containing the pressure of fluid within the well bore, said rotary drill head including a wash pipe, a rotating head assembly positioned to rotate about said wash pipe, and means for sealingly engaging said rotating head assembly to rotate with said rotary drill string, the improvement comprising:

an upper lip seal positioned between said wash pipe and said rotating head assembly, said upper lip seal including a lip portion;

a lower lip seal positioned between said wash pipe and said rotating head assembly, said lower lip seal having a lip portion;

an annular space between said upper lip seal and said lower lip seal with the lip portion of said upper seal and the lip portion of said lower seal being open to said annular space; and means for providing lubricant to said annular space at a pressure substantially 100 psi to 200 psi greater than the pressure of fluid in the well bore whereby said lubricant pressure energizes said upper lip seal and said lower lip seal allowing an infinitesimal amount of lubricant to leak past the lip portions of said upper lip seal and said lower lip seal.

6. A rotary drill head for providing a dynamic seal between a rotary drill string and the well bore thereby containing the pressure of fluid within the well bore, comprising:

a wash pipe connected to said well bore;

a rotating head assembly positioned to rotate about said wash pipe;

means for sealingly engaging said rotating head assembly to rotate with said rotary drill string;

an upper lip seal positioned between said wash pipe and said rotating head assembly, said upper lip seal including a lip portion;

a lower lip seal positioned between said wash pipe and said rotating head assembly, said lower lip seal having a lip portion;

an annular space between said upper lip seal and said lower lip seal with the lip portion of said upper seal and the lip portion of said lower seal being open to said annular space; and means for providing lubricant to said annular space at a pressure substantially 100 psi to 200 psi greater than the pressure of fluid in the well bore whereby said lubricant pressure energizes said upper lip seal and said lower lip seal allowing an infinitesimal amount of lubricant to leak past the lip portions of said upper lip seal and said lower lip seal.

* * * * *

UNITED STATES PATENT AND TRADEMARK OFFICE
CERTIFICATE OF CORRECTION

PATENT NO. : 4,143,880
DATED : March 13, 1979
INVENTOR(S) : Alison Ray Bunting et al It is certified that error appears in the above-identified patent and that said Letters Patent are hereby corrected as shown below:

Column 6, line 41, after "lip" insert -- seal --

Signed and Sealed this

Thirtieth Day of October 1979

[SEAL]

Attest:

RUTH C. MASON
Attesting Officer

LUTRELLE F. PARKER
Acting Commissioner of Patents and Trademarks